April 9, 1940.   B. A. SWENNES   2,196,540
FLUID CLUTCH AUTOMATIC TRANSMISSION
Filed June 8, 1936   3 Sheets-Sheet 1

Inventor:
Benjamin A. Swennes
By Edward C. Fitzhaugh
Atty.

April 9, 1940.   B. A. SWENNES   2,196,540
FLUID CLUTCH AUTOMATIC TRANSMISSION
Filed June 8, 1936   3 Sheets-Sheet 2

Inventor:
Benjamin A. Swennes
By Edward C. Gritzbaugh
Atty.

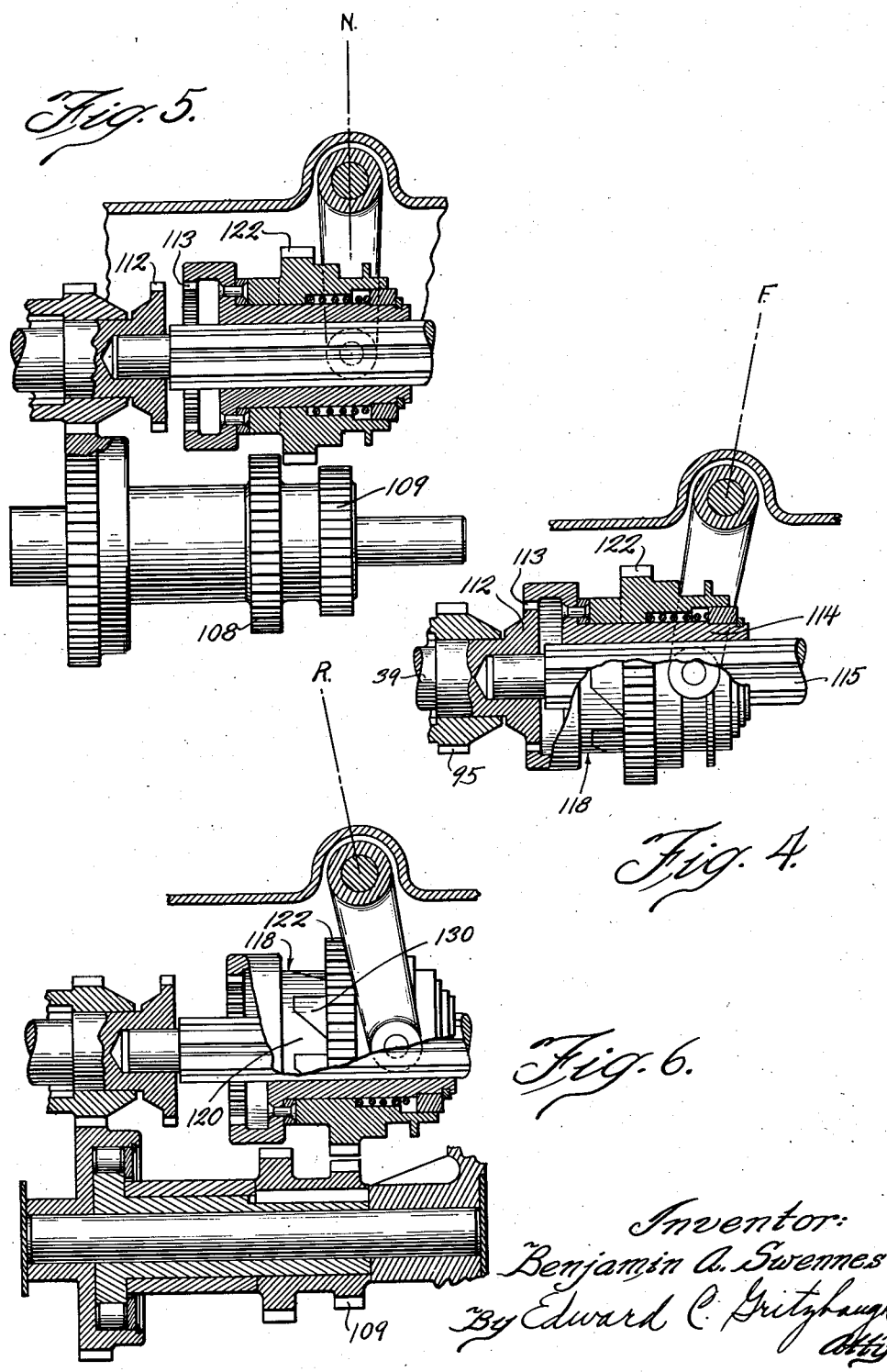

Patented Apr. 9, 1940

2,196,540

UNITED STATES PATENT OFFICE 2,196,540

FLUID CLUTCH AUTOMATIC TRANSMISSION

Benjamin A. Swennes, Rockford, Ill., assignor to Borg-Warner Corporation, Chicago, Ill., a corporation of Illinois Application June 8, 1936, Serial No. 84,080

8 Claims. (Cl. 74—189.5)

This invention has to do with power and speed transmission mechanism for motor vehicles and relates particularly to a mechanism automatically adjustable for speed transmission at different ratios in accordance with changes in speed and torque.

Included among the objects of the present invention is the provision of:

An improved power transmission device instrumental in the starting of a motor vehicle in a selected speed ratio and adapted to maintain such ratio regardless of motor speed so long as there occurs no interruption in driving force;

A novel power transmission comprising a plurality of power trains of different speed ratio automatically and successively changeable in power transmission relation at a time determined by speed and torque;

An improved power transmission including power trains of different speed ratio automatically connectable in driving relation in successive order without reduction in speed of the motor vehicle;

A new power transmission embodying a plurality of power trains of different speed ratio wherein a power train of greater speed ratio has in series therewith a fluid clutch, the transmission being adapted to change from an arrangement in which a power train of lower speed ratio is in driving relation to a position wherein the power train of greater speed ratio is in driving relation coincidental with a reduction of torque through the train of lower ratio.

These and other desirable objects of the invention are obtained through the novel arrangement, the unique construction and the improved combination of the various parts hereinafter described in conjunction with the accompanying three sheets of drawings hereby made a part of the specification, and in which.

Fig. 4 is a fragmentary side elevation of the transmission gearing, there being parts broken away to illustrate a camming device operable to maintain one of the power trains of the transmission out of driving relation during a certain stage of operation of the transmission; and Fig. 5 and Fig. 6 are fragmentary views illustrating the interrelation of parts of the gears while they are arranged, respectively, in neutral and for reverse drive.

Similar parts are designated by the same characters of reference in the various figures of the drawings and throughout the description that follows:

Figure 1:
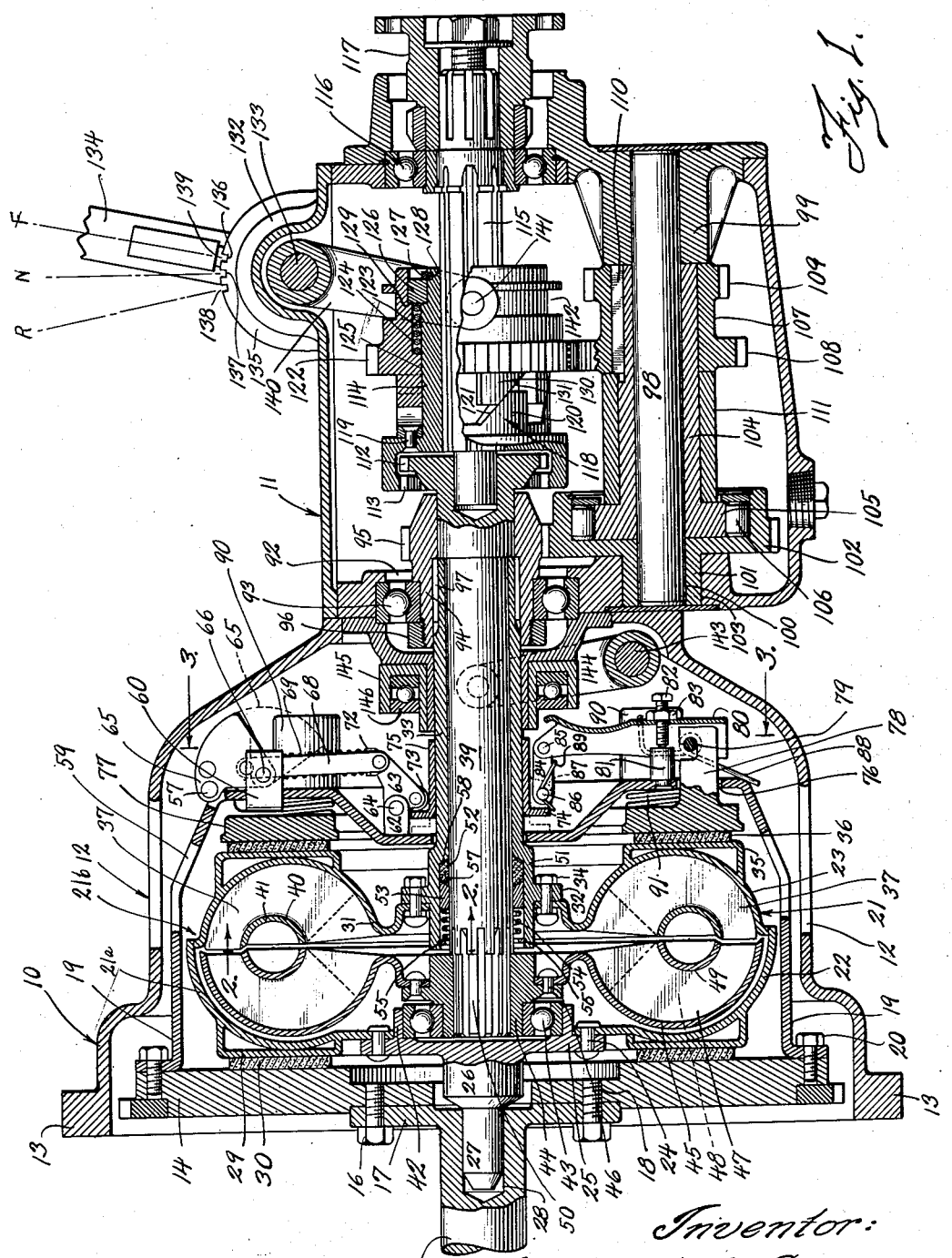
Fig. 1 is a longitudinal sectional view taken axially through a transmission embodying a form of the present invention.
Figure 3:
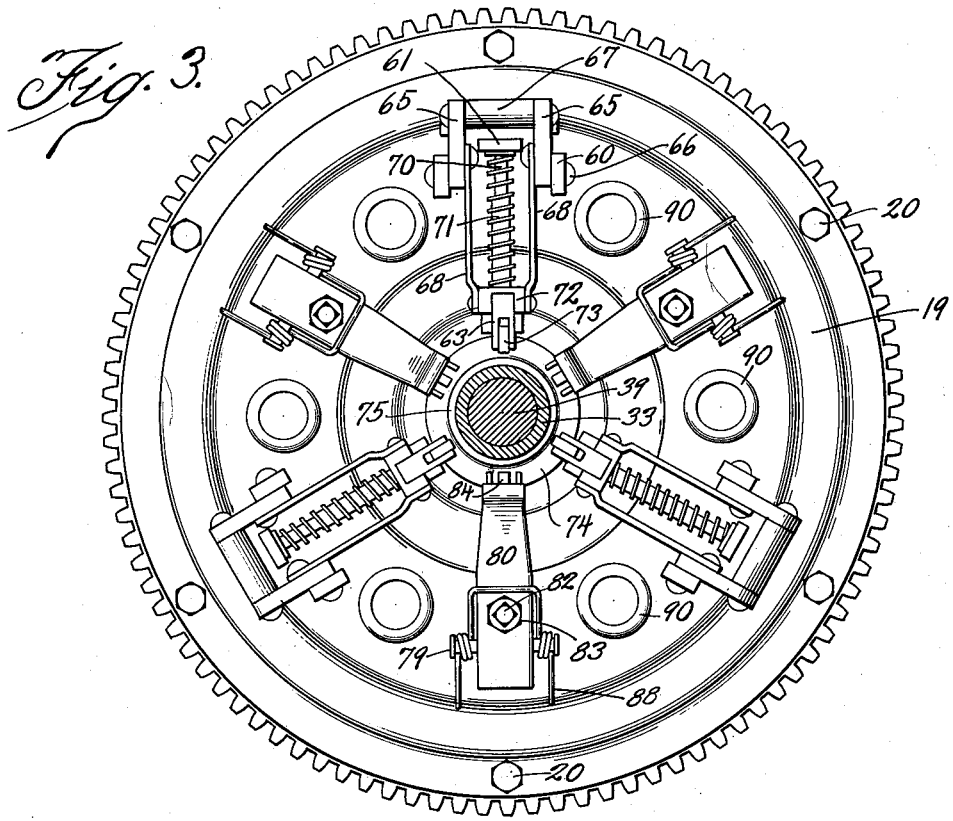
Fig. 3 is a transverse sectional view of the device taken on the line 3—3 of Fig. 1 and illustrates devices for the automatic operation of a friction clutch.

The device as illustrated in Fig. 1 is enclosed in a bell housing 10 and a gear case 11. The bell housing 10 and the gear case 11 may be of cast metal. They are adapted to be secured together by bolts, not shown. The bell housing 10 has a plurality of radially placed openings 12 which provide for air circulation and a means of access to mechanism enclosed therein. A flange 13 about the front or left end of the housing 10 may be secured in any standard manner to the back end of the motor of the vehicle upon which the transmission is installed.

Within the front section of the bell housing 10 is a motor fly-wheel 14 which is secured to the crank shaft 15 of the motor by means of bolts 16. The bolts 16 extend through suitable apertures in a flange 17 which may be integral with the shaft 15, and are threaded into apertures 18 aligned therewith in the fly wheel. The periphery of the fly wheel 14 has attached thereto by means of a series of bolts 20 a bell-shaped clutch carrier member 19.

A fluid clutch indicated generally by the indicia 21 is enclosed by the bell-shaped carrier 19. The impeller member 21a of the fluid clutch 21 has a hollow toroidal section 21b formed of two complemental parts 22 and 23 which are welded or otherwise suitably connected to one another at their peripheral edges. The member 22 of the fluid clutch impeller is connected by a plurality or rivets 24 to the flange 25 of a stub shaft 26 which has a journal section 27 piloted in a bearing 28 within an end of the crank shaft 15. An annular shoe 29 of sheet metal is secured to the front section of the clutch impeller 21a and has attached thereto a friction element 30 for coacting with the back face of the fly wheel 14 during certain stages of operation of the device hereinafter to be described. Part 23 of the fluid clutch impeller 21a has a hub section 31 coupled to a flange 32 projecting radially from a sleeve 33. Bolts 34 are employed for effecting such coupling. Upon the back of the impeller part 23 is an annular friction clutch shoe 35 having thereon a friction element 36.

Figure 2:
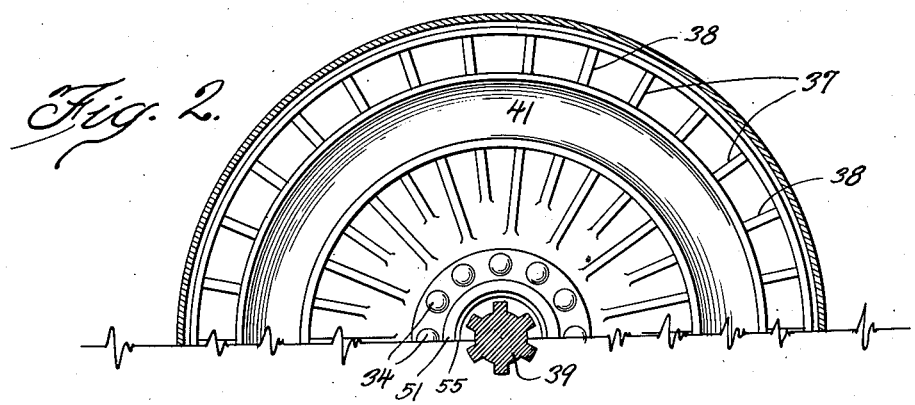
Fig. 2 is a sectional view taken on the line 2—2 of Fig. 1 and showing construction details of the interior of a fluid clutch.

Upon the inner side of the toroidal section of the impeller part 23 is a series of vanes 37 in alternate relation with a series of vanes 38, the vanes of each series being in radial relation with respect to the fluid clutch rotational axis; See Figs. 1 and 2. Each of the vanes 37 and 38 has a notched section 40. Within such notched sections is carried a fluid guide ring 41 of semicircular cross section.

Carried within the recess provided by a circular flange 42 extending backwardly from the flange 25 of the stub shaft 26 is a ball bearing 43 in which there is journalled a hub 44 for a runner 45 enclosed within the fluid clutch impeller 21a. The runner 45 may be secured to the hub 44 by means of rivets 46. Such runner 45 is designed so that the front side thereof is circular and so that the circular section fits relatively closely to the inner surface of the impeller part 22. Projecting from the inner or back side of the runner 45 is a series of vanes 47 and 48 arranged similarly to the vanes 37 and 38 and carrying a fluid guide ring 49 in opposed complemental relation with the ring 41. The front end of the shaft 39 is splined at 50 to facilitate a driving connection between the runner hub 44 and said shaft.

The fluid clutch is made operative by placing a fluid such as oil in the impeller 21a. A plugged opening, not shown, is provided for this purpose in the impeller wall. Thereafter when the impeller is rotated the oil serves as a power transmitting medium between the vanes of the impeller and the runner to cause the latter to tend to follow the movement of the former. During low speed of the impeller only a negligible torque is imparted to the runner; that is, the slip between the impeller and runner is high. The power transmitting efficiency of the fluid clutch increases, however, with increase in rotative speed of the impeller. Sufficient increase in speed of the impeller will so increase the efficiency of the fluid clutch that under the normal load required to drive the vehicle at a corresponding speed there will be no more than one to two percent slip between the clutch impeller and runner.

The shaft 39 is freely rotatable relatively to the sleeve 33. A fluid seal is provided between the shaft 39 and the sleeve 33 within the forward end of the latter which is enlarged as indicated at 51. A body of suitable packing material 52 is stuffed into the enlarged end 51 of the sleeve 33, where it is compressed by a collar 53 which is urged to the right by a compression spring 54. Spring 54 is seated against an abutment member 55 which may be expansible and snapped into place within a groove 56 formed interiorly of the enlarged end 51 of the sleeve. It will be seen in Fig. 1 that the opposed inclined surfaces 57 and 58 upon the collar plunger 53 and the sleeve respectively will cause a compression of the packing material 52 against the shaft 39, thereby increasing the efficiency of the seal.

Automatic means now to be described is employed for connecting the crank shaft 15 with the transmission device. As hereinabove explained, the friction clutch carrier 19 is bolted to the flywheel 14 for rotation therewith. The carrier 19 has a number of openings 59 which provide a means of access to the fluid clutch, and which further provide ventilation for cooling the device. Disposed angularly about the back side of the carrier 19 are three pairs of lugs 60. Between each pair of lugs 60 is a lug 61, and radially inwardly of each lug 61 there is anchored upon the carrier 19 a U-shaped bracket 62. Levers 63 are secured between the legs of the brackets 62 by means of pivot pins 64. Centrifugal weights 65 are pivoted at 66 to the lugs 60, the weights upon each pair of lugs 60 being joined by pins or bolts 67 which in addition to adding to the centrifugal mass of the weights provide for their coordination of action and rigidity of construction. Paired links 68 form a connection between an end of each lever 63 and the weights 65 in radial alignment therewith. The links 68 are pivotally connected with the levers 63 and with their respective weights, the connection with the weights being at a point selectively spaced from their point of pivotal anchorage. A compression spring 69 is placed between each lug 61 and the end of the lever 63 opposed thereto, and to which the links 68 are attached. Telescopically connected guide pins 70 and 71, connected respectively to the lugs 61 and coupling members 72 between the levers 63 and the links 68, serve as retaining means for the springs 69 for maintaining them in position.

Upon the ends of levers 63 opposite to that to which the links 68 are coupled are journalled rollers 73. The rollers 73 are arranged for exerting pressure against a flange 74 turned radially outwardly from a sleeve 75, which is slidable axially of the sleeve 33. At this time it should be noted that the levers 63 are designed to multiply the force of the springs 69 as applied to the sleeve flange 74.

Arranged alternately with the centrifugal mechanisms just described on the back of the bell-shaped carrier 19 are three openings 76. The carrier contains a pressure plate 77 for coaction with friction element 36. Three bosses 78 which may be integral with the pressure plate 77 extend backwardly therefrom through the openings 76. Pivotally connected with each of the bosses 78 by means of pins 79 are levers 80. The levers 80 may be formed of pressed steel. Adjacent to each of the openings 76 and radially inwardly therefrom upon the back of the carrier 19 are fulcrum blocks 81. Adjustable fulcrum members 82 are threaded within the backs of each of the levers 80 and abut against the fulcrum blocks 81 which are aligned therewith. Locking nuts 83 may be used for maintaining a selected adjustment of the fulcrum members 82. The inner ends of levers 80 are connected to the slidable sleeve 75 by means of links 84, the links 84 being secured to their respective levers 80 by means of pins 85 and the sleeve 75 by means of pins 86 anchored in ears 87 projecting radially from the sleeve 75. Spring devices 88 and 89 mounted respectively upon pins 79 and 86 bear against levers 80 and links 84 to prevent rattling of such levers and links during operation of the transmission.

Six spring cups or seats 90 are arranged about the back side of the back of carrier 19 in alternate relation with the centrifugal devices and the levers 80. Strong compression springs 91 have an end confined within the cups 90 and an opposite end bearing against the back side of the pressure plate 77. Thus it will be seen that the springs 91 at all times urge the pressure ring 77 forward to a position in engagement with the friction element 36. It will be noticed that the springs 69 are appreciably lighter and possessive of less force than the springs 91, but are effective to overcome the force of the springs 91 because of the mechanical advantage gained through the levers 63 and 80. When, however, the fly-wheel 14 is rotated at a speed greater than idling speed of the vehicle motor, the weights 65 are thrown outwardly whereby to move the links 68 radially outward to compress the springs 69, which normally oppose and overbalance the force of the springs 91. Outward movement of the links 68 concurrently with the compression of the springs 69 and counterclockwise pivotal movement of the levers 63 permits the springs 91 to force the pressure plate 77 to the left meanwhile pivoting the levers 80 in a clockwise direction, and shifting the sleeve 75 to the right. The force exerted by the pressure plate 77 against the friction element 36 moves the fluid clutch 21 slightly to the left, Fig. 1, to concurrently effect an engagement between the friction element 30 and the fly-wheel 14. At this time there will be effected a driving connection between the vehicle motor and the impeller element of the fluid clutch; and through the intervention of parts now to be described, a low speed driving train will be completed through the transmission device.

The opening 92 in the front wall of the gear box 11 has secured therein a ball bearing 93. Journalled within the ball bearing is a sleeve 94 formed integrally with a gear 95. Relative axial movement between the gear 95 and the bearing 93 is precluded by a nut 96 threaded upon an end section of the sleeve 94 into abutting relation with an element of the bearing 93. The sleeve 94 is non-rotatively connected to the sleeve 33 by a splined connection 97. The connection 97, however, allows a slight relative axial displacement between the sleeves 33 and 94 and hence permits of the axial movement of the fluid clutch impeller 21a as set out hereinabove in conjunction with the description of the manner in which the pressure plate 77 causes engagement of the friction element 30 with the fly-wheel 14.

A countershaft 98 is journalled in bearings 99 and 100, the bearings being respectively within an end wall of the gear case 11 and the hub 101 of a gear 102. The gear hub 101 is journalled at 103 in the gear case. Gears 95 and 102 are in constant mesh with one another. A sleeve 104 journalled upon the countershaft 98 has an overrunning connection at 105 with the gear 102 by means of the rollers 106. Any standard construction may be used for the overrunning clutch connection between the gear 102 and the sleeve 104.

A gear cluster 107 comprising gears 108 and 109 is keyed at 110 to the right end of the sleeve 104. The proper spacing between the gear cluster element 107 and the gear 102 is maintained by means of a collar 111 and the inner end of the bearing 99.

A jaw clutch element 112 for co-engagement with a jaw clutch element 113 is formed integrally with the right end of the shaft 39. The jaw clutch 113 forms a part of a sleeve 114 which is splined upon a driven shaft 115. One end of the driven shaft 115 is journaled in a bearing 116 within the right end of the gear case 11. The opposite end of the shaft 115 has an end section of reduced diameter journalled within the recessed end of the shaft 39. Secured to the back end of the shaft 115 is a coupling member 117 for facilitation of a connection between the driven shaft 115 and the propeller shaft, not shown, of a vehicle upon which the transmission may be installed.

A circular cam member 118 is slid upon the sleeve 114 and anchored thereto in any suitable manner as by means of pins 119. A series of cam projections 120 having inclined camming surfaces 121 project backwardly from the cam member 118 in spaced relation to one another. A gear 122 is placed upon the sleeve 114 in a manner permitting of relative rotation and relative axial movement between the sleeve and the gear. Subsequent to the placing of the gear 122 upon the sleeve 114 a compression spring 123 is inserted into a recessed section 124 of the gear in abutting relation with the bearing section 125 thereof. An abutment ring 126 is placed behind the spring 123 and there held in position by a key 127 which may be in the form of a split ring adapted to snap into a groove 128 encircling the right end of the sleeve 114. An internal shoulder 129 coacts with the stop 126 to limit axial movement between the gear 122 and the sleeve 114 in one direction, while axial movement between the gear and sleeve in the opposite direction is limited by the cam 118. Cam projections 130 having inclined cam surfaces 131 for coacting with the cam surfaces 121 extend forwardly from the gear 122.

Journalled within a bearing 132 upon the top of the gear box 11 is a shaft 133 carrying a hand operated gear shifting lever 134. A semi-circular piece 135 is arranged coaxially with the shaft 133 and contains three notches 136, 137 and 138 for engagement with a manually operated latch 139 carried upon the gear shifting lever 134. Also carried upon the shaft 133, interiorly of the gear box 11, is a yoke 140 the legs of which carry pins 141 diametrically opposed with respect to the axis of the sleeve 114 and extending into a groove 142 therein.

The gear shifting lever 134 is shiftable into positions R, N or F indicating reverse, neutral and forward positions, respectively, for the gear 122. Figs. 1 and 4 show the gear 122 in the position it occupies when the transmission is set for driving the vehicle forward. In Fig. 5 the gear 122 is shown in the neutral position, and in Fig. 6 the gear 122 is shown in the position occupied when the transmission is arranged for transmitting reverse drive to the vehicle. When in the reverse drive position, the gear 122 is driven by the gear 109 through the intervention of an idler gear, not shown, in accordance with standard practice.

The operation of the device will now be described:

First, it will be assumed that the gear 122 is in the forward drive position corresponding to position F of the gear shifting lever 134. Axial movement of the gear 122 is precluded by the engagement of the latch 139 with the notch 136. Gears 122 and 108 will be meshed as shown in Fig. 1. Sleeve 114 will be urged backwardly by the spring 123 to effect an engagement between jaw clutches 112 and 113 as shown in Fig. 4. The inertia weight members 65 will be in the inward radial position shown in dotted outline in Fig. 1 and thereby permitting the springs 69 to exert their full force in opposition to the springs 91 which tend to effect an engagement between the pressure ring 77 and the friction element 36, and between the fly-wheel 14 and the friction element 30. The vehicle motor may be started in the conventional manner. So long as the motor is not driven above idling speed, the weights 65 will remain substantially within their inner position, and the clutching connection between the fly-wheel, the parts carried thereby and the impeller member of the fluid clutch 21 will be constrained.

Incident to an acceleration of the motor, the weights 65 will move radially outwardly to cause a clutching engagement between the fly-wheel 14 and the impeller member of the fluid clutch in the manner hereinabove described. There will then be completed a power train of fixed speed transmission between the crank shaft 15 and a torque tube, not shown, connected to the coupling member 117. Power, at a reduced speed transmission, is delivered successively through the various elements of such power train in the following order:

Crank shaft 15, fly-wheel 14, carrier 19, pressure plate 77, friction elements 30 and 36, the fluid clutch impeller 21ª, sleeve 33, gear 95, gear 102, clutch rollers 106, sleeve 104, gears 108 and 122, cam 118, sleeve 114, and driven shaft 115. Because of the resistance of the vehicle load, there will be a development of torque between the cam projections 130 of the gear 122 and the cam projections 120 of the cam member 118. As a consequence of the torque thus developed, the bevelled camming surfaces 131 and 121 coact to move the sleeve 114 to the left, Fig. 1, coincidental to compressing the spring 123 and disengaging the jaw clutches 112 and 113. The gear 122 and the cam member 118 will, as an incident to such movement, be separated from the position shown in Fig. 4 to the position shown in Fig. 1. Further separation of the gear 122 and the cam member 118 is prevented by the abutment of ring 126 with the shoulder 129. The projecting cam parts 120 and 130 are thus left in a meshed position so that driving force may be imparted from the latter to the former.

At low speeds of the fluid clutch impeller member 21ª only a negligible driving force is imparted to the runner 45, and hence to the shaft 39. At the time, therefore, that the drive is established through the power train of reduced speed transmission, the operation of which has just been described, and while there is an engagement between the jaw clutch members 112 and 113, only an inconsequential amount of torque is being transmitted through the jaw clutch members. It follows that substantially no torque is transmitted between the jaw clutch members 112 and 113 at the time of their automatic disengagement by the axial movement of the sleeve 114. But upon an increase in speed of the driving member of the fluid clutch 21, the clutch's efficiency greatly increases so that the runner 45 will rotate at practically the same speed as the clutch driving member even though the runner is subjected to a load such as that required to drive the vehicle. If the jaw clutch members 112 and 113 are connected while the fluid clutch is rotating at the increased speed, an efficient direct drive of the vehicle can be obtained.

While the operator continues to feed fuel to the motor so that load is carried by the power train of reduced speed transmission, the cam member 118 and the sleeve 114 and jaw clutch 113 will be held to the left, Fig. 1, so that the direct drive connection with the driven element of the fluid clutch will be prevented. This feature of the present device enables the operator to maintain the low speed driving connection as long as he may desire. He may, by release of the motor accelerator, materially diminish the amount of torque transmitted through the power train of reduced speed transmission thereby eliminating that component of force between the cam projections 120 and 130 that overcomes the force of the spring 123. Thereupon, the spring 133 becomes effective to shift the sleeve 114 and jaw clutch 113 to the right, Fig. 1, thereby co-engaging the jaw clutch members 112 and 113. The engagement of jaw clutch members 112 and 113 which may be rotating at different speeds at the time of their engagement may be facilitated by the employment of any conventional form of synchro-mesh mechanism, not shown.

Concurrently with the establishment of direct drive from the driving member of the fluid clutch 10 through the driven member 45 thereof, the shaft 39, jaw clutch members 112 and 113, the sleeve 114, and the driven shaft 115, gear 122 will drive the gear 108 and sleeve 104 at a greater speed than the speed of rotation of the gear 102. It is at this time that the overrunning connection 105 comes into play to permit the sleeve 104 to overrun the gear. This construction of overrunning clutch is standard and is believed to require no detailed description of minor parts or of their operation.

The device will remain in the direct drive connection until there is such a reduction in the speed of the fluid clutch and/or delivery of torque thereby as will cause between the driving and driven elements thereof a slippage resulting in a speed transmission ratio less than that of the reduction gear power train. At that time the drive will be automatically established through the power train of fixed ratio. The drive through the direct power train may again be established either by an increase in vehicular speed and a subsequent reduction of torque in the manner hereinabove described, or by a simple reduction in torque.

Manually operated means for independent actuation of the friction clutch pressure plate 77 will now be described. Extending transversely of the bell housing 10 is a shaft 143 upon which there is non-rotatively placed a yoke 144 of which the opposed legs are connected operatively with a collar 145 shiftable longitudinally of the sleeve 33. The collar 145 carries within a circular channel section thereof a roller bearing device 146. Means, not shown, within the driving compartment of the vehicle may be employed for rotating the shaft 143, thereby causing movement of the bearing member 146 to the left, Fig. 1, against the inwardly projecting ends of levers 80. Such movement of the bearing member 146 is adapted to cause counter-clockwise rotation of the levers 80 and consequential displacement of the pressure plate 77 from the friction element 36. Because of the connecting links 84 between the levers 80 and the sleeve 75, the sleeve will be moved from the position shown in full outline in Fig. 1 to the position shown in dotted outline. Operation of the manual means thus described for operation of the friction clutch pressure plate 77 may become necessary only in instances of emergency while the fly-wheel 14 is rotating at a sufficient speed to effect automatic engagement of the friction clutch. It will be noted that the manual operation for releasing the clutch is in no way impeded by the tendency of the automatic mechanism to permit of clutch engagement. The manually operated parts for releasing the clutch are simply substituted for the automatic mechanism and operate independently thereof when releasing the clutch.

The automatic transmission is arranged in a neutral position when the gear shifting lever 134 is moved into the position N with an engagement between the latch member 139 and the notch 137.

At such time, the gear 122 will be in a position half way between the gears 108 and 109 so that it is impossible for power to be delivered to the gear 122 through the power train of low speed transmission. Simultaneously with the movement of the gear 122 into the neutral position the jaw clutch member 113 is moved to the right of jaw clutch member 112 as illustrated in Fig. 5. The power train for direct drive is broken with the disengagement of clutch members 112 and 113.

Reverse drive through the transmission mechanism is accomplished by shifting the lever 134 into the position R where it is maintained by the engagement between the latch 139 and the notch 138. At this time the gear 122 and the idler gear, not shown and in constant mesh with the gear 109 will be engaged. While the transmission is transmitting power for reverse drive the squared or back driving surfaces of the cam projections 120 and 130 will be pressed together and there will be no tendency for the cam 118 to be displaced from the gear 122.

While the specification has been confined to the exemplification of a single embodiment of transmission, the invention extends to many obvious modifications and structural variations thereof coextensive with the scope of the appended claims.

I claim as my invention:

1. A transmission mechanism comprising driving and driven members, a power train of variable speed transmission between said members including a fluid clutch in series with said power train, means in said power train movable to break the driving connection thereof, a power train capable of relatively lower speed transmission between said members, said lower speed power train including a portion of said movable means, intermeshed rotatable camming members operatively connected to said lower speed train of which one is axially movable incident to the transmission of power thereby, and an operative connection between said movable means and said axially movable camming member to provide for such movement of the former being effected by the axial movement of the latter.

2. In a transmission mechanism, driving and driven members, parallel power trains between said members, one of said power trains being of fixed speed ratio and the other of said trains being of variable speed ratio and increasing in driving efficiency upon an increase in speed of the driving member to an extent adapting it to take over the entire transmission load, and torque responsive means in series with the fixed ratio power train, said torque responsive means being actuated to delay the time at which the train of variable speed ratio takes over the entire transmission load and energized in accordance with the load transmitted by the train of fixed speed ratio.

3. In a transmission mechanism, driving and driven members, parallel power trains between the driving and driven members having common movable means, one of said trains being of fixed speed ratio and the other being of variable speed ratio and adapted to take over the transmission load from the fixed ratio speed train, and torque responsive means connected to said train of fixed speed ratio and operable through said common movable means to delay the transfer of load from the power train of fixed speed ratio to the power train of variable speed ratio, said torque responsive means being energized in accordance with the load transmitted by the train of fixed ratio, and being effective as long as the load transmitted by said train is appreciable.

4. In a transmission mechanism, driving and driven members, parallel power trains between the driving and driven members having a common movable means, one of said trains being of fixed speed ratio and the other being of variable speed ratio and adapted to take over the transmission load from the fixed ratio speed train, a detachable connecting means in series with the train of variable speed ratio, and torque responsive means connected to said fixed speed ratio and operable through said common movable means to maintain said connecting means detached and energized coincidentally with the transmission of load by the train of fixed ratio.

5. In a transmission mechanism, driving and driven members, parallel power trains of relatively low and high speed ratio between the driving and driven members and having common movable means, the high speed ratio train being responsive to an increase in speed in the driving member to assume the transmission load, a disengageable connection in the power train of high speed transmission for completing the connection through said train, means yieldingly tending to engage said connection through said common movable means, and torque responsive means connected to the low speed ratio train for disengaging said connection, said torque responsive means being energized coincidentally with the transmission of load by the train of lower speed ratio.

6. A transmission mechanism comprising a driving member, a driven member, a power train of variable speed transmission between said members comprising an impeller adapted to be driven from the driving member, a runner cooperatively related to the impeller and capable of effecting a driving connection between the impeller and driven member, and a jaw clutch controlling the effectiveness of the power train to transmit torque between the driving and driven members; a power train capable of relatively lower speed transmission between said members, intermeshed rotatable camming members connected to said lower speed train of which one is axially movable incident to the transmission of power thereby, and a rigid connection between said jaw clutch and axially movable camming member to provide for such movement of the former being effected by the axial movement of the latter.

7. A transmission mechanism comprising driving and driven members, a power train of variable speed transmission between said members, means in said train movable to break the driving connection through said power train, a power train capable of lower speed transmission connected between said members and including a portion of said movable means, intermeshed rotatable camming members connected to said lower speed train of which one is axially movable incident to the transmission of power thereby, said portion of said movable means forming an operative connection between said movable means and said axially movable camming member to provide for such movement of the former being effected by the axial movement of the latter.

8. A transmission mechanism comprising driving and driven members, a power train of variable speed transmission between said members, a jaw clutch in said train for controlling the effectiveness of the power train to transmit torque between the driving and driven members, a power train capable of relatively lower speed transmission between said members, intermeshed camming members in said lower speed train, one of said camming members being axially movable incident to the transmission of power thereby, and an operative connection between said jaw clutch and the axially movable camming member whereby to release said jaw clutch upon an axial movement of the movable camming member.

BENJAMIN A. SWENNES.